(12) United States Patent
Dice et al.

(10) Patent No.: US 8,775,837 B2
(45) Date of Patent: Jul. 8, 2014

(54) SYSTEM AND METHOD FOR ENABLING TURBO MODE IN A PROCESSOR

(75) Inventors: David Dice, Foxboro, MA (US); Nir N. Shavit, Cambridge, MA (US); Virendra J. Marathe, Florence, MA (US)

(73) Assignee: Oracle International Corporation, Redwood, CA (US)

( * ) Notice: Subject to any disclaimer, the term of this patent is extended or adjusted under 35 U.S.C. 154(b) by 359 days.

(21) Appl. No.: 13/213,833

(22) Filed: Aug. 19, 2011

(65) Prior Publication Data

US 2013/0047011 A1 Feb. 21, 2013

(51) Int. Cl.
*G06F 1/32* (2006.01)
*G06F 1/00* (2006.01)
*G06F 15/00* (2006.01)
*G06F 9/46* (2006.01)

(52) U.S. Cl.
USPC .............. 713/320; 713/323; 712/28; 718/100

(58) Field of Classification Search
USPC ....................... 713/320, 323; 712/28; 718/100
See application file for complete search history.

(56) References Cited

U.S. PATENT DOCUMENTS

| | | | | |
|---|---|---|---|---|
| 5,189,647 A | * | 2/1993 | Suzuki et al. | 368/10 |
| 7,930,574 B2 | * | 4/2011 | Cai et al. | 713/322 |
| 8,074,093 B1 | * | 12/2011 | Johnson | 713/322 |
| 2003/0163512 A1 | * | 8/2003 | Mikamo | 709/102 |
| 2012/0179938 A1 | * | 7/2012 | Nijhawan et al. | 714/47.2 |
| 2012/0284729 A1 | * | 11/2012 | Sharda et al. | 718/104 |

OTHER PUBLICATIONS

M. Aater Suleman et al., Accelerating Critical Section Execution with Asymmetric Multi-Core Architectures, pp. 253-264; Mar. 7-11, 2009; Washington, DC.
Danny Hendler et al., Flat Combining and the Synchronization-Parallelism Tradeoff, pp. 1-10; Jun. 13-15, 2010; Thira, Santorini, Greece.
Department of Information Science, Faculty of Science University of Tokyo; Y. Oyama et al., Executing Parallel Programs with Synchronization Bottlenecks Efficiently, pp. 1-23; 1999; Tokyo, Japan.

* cited by examiner

*Primary Examiner* — Stefan Stoynov
(74) *Attorney, Agent, or Firm* — Robert C. Kowert; Meyertons, Hood, Kivlin, Kowert & Goetzel, P.C.

(57) ABSTRACT

The systems and methods described herein may enable a processor core to run at higher speeds than other processor cores in the same package. A thread executing on one processor core may begin waiting for another thread to complete a particular action (e.g., to release a lock). In response to determining that other threads are waiting, the thread/core may enter an inactive state. A data structure may store information indicating which threads are waiting on which other threads. In response to determining that a quorum of threads/cores are in an inactive state, one of the threads/cores may enter a turbo mode in which it executes at a higher speed than the baseline speed for the cores. A thread holding a lock and executing in turbo mode may perform work delegated by waiting threads at the higher speed. A thread may exit the inactive state when the waited-for action is completed.

20 Claims, 6 Drawing Sheets

SYSTEM AND METHOD FOR ENABLING TURBO MODE IN A PROCESSOR

BACKGROUND

1. Field of the Disclosure

This disclosure relates generally to computer systems, and more specifically to systems and methods for enabling one or more processor cores to run at a higher speed than other processor cores.

2. Description of the Related Art

Many modern processors incorporate multiple processing cores per physical package. Typically, each of these cores exposes one or more logical processors to software. Each core typically includes register state for each of those logical processors, one or more caches, and one or more execution pipelines. Each physical package has thermal and power limits that prevent all cores within that package from running simultaneously at full speed for prolonged periods. Therefore, when all cores are simultaneously active, the package's power control unit (PCU) forces those cores to run at a "baseline" speed. This baseline speed is typically the advertised speed for the processor.

In some of these multi-core processors, if only one (or a small number) of cores is active on a given package, that package's PCU can run that core (or cores) at a speed that is higher than the baseline speed without violating the thermal and power constraints of the package. In one example, this higher speed is 1.1 to 1.5 times faster than the baseline speed, yielding a faster clock rate and faster processing speed for threads running on that core. This facility is referred to herein as "turbo mode". The number of processors that need to be inactive (or quiesced) for the remaining processor(s) to reach turbo mode is referred to herein as the "turbo quorum". The current trend, which is expected to continue, is for the ratio between turbo mode speeds and baseline speeds to increase over time as new generations of processors are delivered.

Other multi-core processors include an asymmetric performance environment in which a fixed set of processors in a system is configured to run faster than the others. In such an environment, threads running contended critical sections could be scheduled or dispatched onto the faster processors to improve overall performance of a group of coopering threads.

SUMMARY

The systems and methods described herein may in various embodiments enable one or more processor cores (each of which provides one or more logical processors) to run at a higher speed than other processor cores (i.e. in a turbo mode). For example, the system may recognize that enough threads executing on the processor cores are waiting on other threads to make up a turbo quorum, and the system may place those threads (and/or the cores on which they are running) into an inactive state (e.g., a quiesced state) to enable one or more other threads (or cores) to enter turbo mode. In various examples described herein, the terms "core" and "processor core" may be used to refer to one of the logical processors present in a physical package.

In some embodiments, while multiple concurrent threads are executing in a computer system on a plurality of processor cores, a given one of the threads may begin waiting for another thread to complete a particular action. In response to determining that one or more other threads are waiting for another thread to complete an action, the given thread may enter an inactive state. In various embodiments, the waiting threads may all be waiting for the same thread to complete an action (whether the same action or different actions) or the waiting threads may be waiting for two or more different threads to complete an action. In some embodiments, the given thread and/or the other waiting threads may be waiting for another thread to release a lock, or to relinquish ownership of a held lock to one of the waiting threads (e.g., the given thread or another one of the waiting threads). In such embodiments, the given thread (and/or the other waiting threads) may have begun waiting on the lock holder in response to a failed or abandoned attempt to acquire the lock.

In some embodiments, the given thread may be said to put itself into an inactive state (e.g., a quiesced state or another low-power state recognized as an inactive state) when it invokes one or more instructions to put the core on which it executes into an inactive state. For example, the given thread may execute a HALT type instruction or a MONITOR-MWAIT type instruction pair to put the core on which it executes into an inactive state. A HALT type instruction may make a core transiently inactive, while a MONITOR-MWAIT type instruction pair may allow a processor to monitor a location in memory for changes, and to put the executing logical processor in a low-power state while waiting.

In some embodiments, in response to determining that enough of the threads are waiting to meet the applicable turbo quorum, one or more other ones of the waiting threads may enter an inactive state. In some embodiments, in response to determining that a quorum of the threads/cores are in an inactive state, one of the threads/cores that is in an active state may enter a turbo mode. Executing in the turbo mode may include executing at a higher speed than the baseline speed at which the threads/cores execute when all of the threads/cores are assumed to be active. In some embodiments, when a thread begins waiting for another thread, it may store data indicating that it is waiting for another thread to complete an action, an identifier of the thread on which it is waiting, and/or an indication of whether it is waiting in an active or an inactive state in a table, waits-for graph, or another data structure used to track such relationships. In such embodiments, determining that other threads are waiting for another thread to complete an action and/or determining that a quorum of threads are waiting or inactive may include accessing (and analyzing) the stored data. In embodiments in which each of the processor cores executes two or more threads, determining that a quorum of threads/cores are in an inactive state may include determining that the two or more threads executing on each of two or more of the processor cores are in an inactive state.

In some embodiments, prior to putting itself in an inactive state, the given thread and/or one or more other waiting threads may log one or more work items in a list of work items to be performed by a thread that holds a particular lock. In some embodiments, the active thread that enters the turbo mode may be a thread that holds the lock on which the given thread and/or other threads are waiting. In some such embodiments, the thread that holds the lock may perform some or all of the work items logged on the list (i.e. the delegated work items) while executing in turbo mode (e.g., after completing its own tasks).

In various embodiments, a given thread may exit the inactive state and resume execution in an active state in response to the action on which it is waiting being performed and/or in response to any work items it delegated to a lock holder being completed. For example, a thread may exit the inactive state in response to an indication that the lock holder on which the thread is waiting has released the lock and/or that ownership of the lock has been passed to the given thread, or in response to detecting a change in the list of work items associated with a particular lock, the removal of work items that the given thread added to a work delegation list, a change in the status of the work items that the given thread added to a work delegation list, or a change in the value of a target of one or more work items that the given thread added to a work delegation list, such as a change in the value of a shared location that is made on behalf of the given thread by the lock holder. In other embodiments, the operating system or another executing thread or process may cause the given thread to exit the inactive state (e.g., by initiating an interrupt or another type of exception) in response to a waited-for condition being met (e.g., in response to a waited-for lock being released).

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

The systems and methods described herein may enable one or more processor cores to run at a higher speed than other processor cores (i.e. in a turbo mode). For example, the system may recognize that enough threads are waiting on other threads to make up a turbo quorum, and the system may place those threads (and/or the cores on which they are running) into an inactive state to enable one or more other threads to enter turbo mode. Techniques for recognizing situations in which such a turbo mode can be exploited and for facilitating the use of such a turbo mode are described herein, according to various embodiments.

As noted above, many modern processors incorporate multiple processing cores per physical package, and each core may expose one or more logical processors to software. Some of these processors support a turbo mode in which, if only one (or a small number) or cores is active on a given package, that package's PCU can run that core or cores at a speed higher than the baseline without violating the thermal and power constraints of the package. In one example, a processor package (or processor chip) includes eight cores, each of which exposes a logical processor core. Therefore, a total of eight threads can be running simultaneously on the processor chip. In this example, if the baseline (or advertised) speed (which may be gated by thermal and/or power limits) is 2.4 GHz, but not all of the cores are actually running, some of the cores could run faster while the chip still stays within the thermal/power limits. In other words, if a sufficiently large subset of the cores on a package are simultaneously inactive, the other cores may be able to run faster by way of turbo mode. In this example, if seven of the cores are idle or are running something "polite" (e.g., an application or other series of instructions that does not consume much power), the eighth core could be run much faster (e.g., around 3 GHz), and the processor could still meet the physical thermal and power constraints of the package. Note that on some processors that support such a turbo mode, only one thread/core may be able run in the turbo mode (e.g., one of eight cores/threads). On other processors, two or more threads/cores may be able to run in a turbo mode (e.g., two out of eight core/threads). In general, for each multi-core processor chip, there exists a limit on the number of threads/cores that can run in a turbo mode and/or on the number of inactive threads that are required in order to allow other(s) to run in the turbo mode.

In various embodiments, the systems and methods described herein may take advantage of the fact that various threads are running on a processor that includes a turbo mode facility, i.e. they may manipulate the use of that turbo mode for improved performance. For example, in a conventional system, when one thread T1 needs to wait for another thread to complete some action, T1 might use a spin-then-block strategy. In such systems, T1 would spin for a short period of time in anticipation of the waited-for action being completed by some other thread during T1's spin interval. If spinning fails (i.e. if the waited-for action does not complete during the spinning interval), T1 will instead block, voluntarily invoking operating system primitives to de-schedule itself and allow other eligible (ready) threads to run on the processor being vacated by T1. Spinning, when successful, can be preferable to blocking, however, as (a) a spinning thread is typically more responsive to the completion of the waited-for action (meaning that there could be less latency between the time the action completes and time thread T1 resumes operation), and (b) context switching arising from blocking is relatively expensive and can cause subsequent cache misses when T1 finally resumes execution after blocking (since T1's resident cache state may have been evicted by threads that ran in the period when T1 was de-scheduled).

For example, if one or more threads were waiting on a lock, each thread might spin for a while (to avoid a context switch), and then (if it was not yet successful in acquiring the lock), it might block (e.g., it might invoke various operating system primitives in order to de-schedule itself). However, in various embodiments, if one or more threads were waiting on a lock, the systems described herein may explicitly take action to enable a different thread to enter turbo mode. In some embodiments, the systems may employ instructions implemented on the processor to put the waiting threads in an inactive state. For example, one processor that includes a turbo mode also includes a MONITOR-MWAIT instruction pair. This MONITOR-MWAIT instruction pair allows a processor to monitor a location in memory (e.g., a single cache line) for changes, and puts the executing logical processor in a low-power state while waiting. The processor (e.g., a power control unit or other component thereof) may recognize this low power state as an inactive state. In another processor, executing a HALT type instruction may make a core transiently inactive. In these and other processors, a given thread may put itself into an inactive state by invoking one or more instructions to put the logical processor (or core) on which it executes into an inactive state. In various embodiments, if at least a pre-determined number of cores/threads (which is defined as the turbo quorum) enter an inactive state, another thread (e.g., the thread holding the lock) may enter turbo mode. Allowing a lock holder to run in a turbo mode may in some embodiments accelerate the execution of a critical section or the release of a shared resource.

In some embodiments, if one or more threads executing on a processor that includes a turbo mode facility recognize that enough threads are waiting on other threads to make up a turbo quorum, those threads may put themselves into an inactive state, which may, in turn, enable one or more other threads to enter the turbo mode. For example, if a given thread begins waiting for another thread to perform some action, and that waiting thread recognizes that other threads are also waiting (either for the same thread on which the given thread is waiting or on one or more other threads), the given thread may put itself in an inactive state (e.g., by executing a MONITOR-MWAIT instruction pair, or one or more other instructions that place the thread and/or the core on which it is running, in a low-power or inactive state). In some embodiments, the system may track which threads are waiting on other threads in one or more data structures, and the given thread may access the data structure(s) to determine whether (and/or how many) other threads are also waiting for the same thread or other threads to complete an action. In some embodiments, the data structure(s) may track which, if any, waiting threads have placed themselves in an inactive state. In various embodiments, if the given thread and/or any other waiting threads recognize that enough threads are waiting to make a turbo quorum, the given thread and/or the other waiting threads may place themselves in an inactive state. In other embodiments, any waiting thread may place itself in an inactive state if one or more other threads are waiting and/or are inactive, regardless of whether doing so would create a turbo quorum.

In some embodiments, program code configured for multi-threaded execution may implement a table or other data structure that maintains information indicating, for example, which threads hold various locks, which threads are spinning on various locks, and/or which threads are waiting for another thread to complete a particular action. In various embodiments the table (or other data structure) may include an indication of the thread on which each waiting is waiting. In some embodiments, if (based on the information stored in the table or other data structure) it appears to a given waiting thread that the system might be able to make a turbo quorum, the given thread may be put in a low-power state or an inactive state (e.g., it may execute instructions to put itself into such a state). In various embodiments, decisions about when and/or whether to put one or more waiting threads in an inactive state may be made in a centralized or de-centralized manner. For example, in embodiments that employ a centralized decision-making process, an operating system may coordinate between waiting threads in order indicate to them that they should place themselves an inactive state and/or may take actions that explicitly cause the waiting threads to be placed in an inactive state. In other embodiments, when one or more waiting threads notice that a large subset of the other executing threads are waiting (e.g. for a lock), the threads themselves may decide to work together to enable the lock holder run faster. For example, a given thread may attempt to acquire a lock that protects a critical section or shared resource. If the lock is already held by another thread, the given thread may access a table (or other data structure) such as that described above to determine whether other threads are also waiting (e.g., to determine whether other threads are waiting on the same lock or another lock). If so, the given thread may put itself into a low power (inactive) state. In another example, thread may access such a table (or other data structure) while spinning to determine whether multiple threads are spinning for the same things. If so, the thread may decide to spin differently (e.g., in a low power or other inactive state).

In various embodiments, the system described herein may include a mechanism that tracks which threads on a core are waiting for other threads currently executing on that same core to complete some action. If a turbo quorum of waiting threads is reached, the waiting threads may intentionally switch from a standard busy-wait type spinning mechanism to a mechanism in which the threads wait in an inactive state (e.g., by invoking instructions such as MONITOR-MWAIT). This may allow a waited-for thread to enter turbo mode and to more expeditiously complete its action. That, in turn, may allow the waited-for condition to be completed earlier, and may allow the waiting threads to resume performing useful work at an earlier time. In various embodiments, this approach may improve both the throughput and the responsiveness of a set of cooperating threads.

Note that in some embodiments, it may be sufficient to know merely that other threads are waiting in order to determine whether to put a given thread in an inactive state. In other words, the determination may not be dependent on the condition (or lock) on which the other threads are waiting, but only on the fact that they are waiting at all. In such embodiments, putting the given waiting thread in an inactive state may help speed up a thread on which one or more other threads are waiting other than the one on which the given thread is waiting (e.g., a thread holding a lock other than one on which the given thread is waiting). This may, in turn, improve the overall performance of the system, whether or not it results in accelerating execution of the thread on which the given thread is waiting. In some embodiments, waiting threads may cooperate with each other using a "flocking" type behavior. In such embodiments, two or more waiting threads may indicate to each other than if one or more of the other waiting threads enters an inactive state, the others will enter the inactive state as well. In other words, in embodiments in which the waiting threads implement a flocking type mechanism, a given waiting thread may not put itself into an inactive state until or unless a group of waiting threads (or which it is a member) agrees to put themselves into an inactive state.

Figure 1:
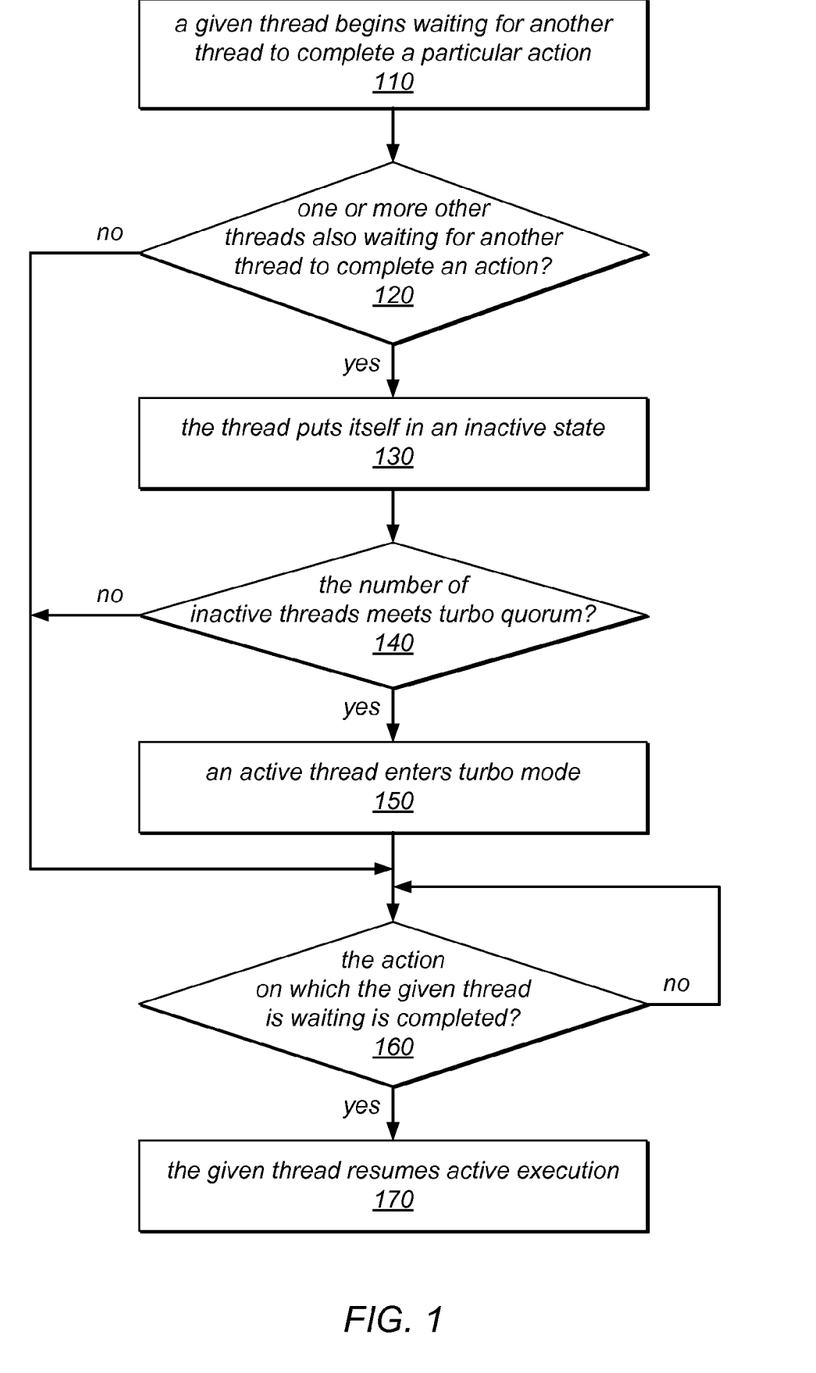
FIG. 1 is a flow diagram illustrating a method for enabling a processor core, or a thread executing thereon, to enter turbo mode, according to one embodiment.

One embodiment of a method for enabling turbo mode is illustrated by the flow diagram in FIG. 1. As illustrated at 110, in this example, the method may include a given thread beginning to wait for another thread to complete a particular action. In some embodiments (including some described herein), the given thread may be waiting for the other thread to release a lock, while in other embodiments, the given thread may be waiting for the other thread to perform or complete some other arbitrary type of action. If one or more other threads are also waiting for another thread to complete an action, shown as the positive exit from 120, the method may include the given thread putting itself into an inactive state, as in 130. For example, the given thread may execute a HALT type instruction or a MONITOR-MWAIT type instruction pair, or may take other steps to place itself in an inactive state, according to different embodiments. In some embodiments, the action on which some or all of the other waiting threads (i.e. the waiting threads other than the given thread) are waiting may be the same action on which the given thread is waiting. In other embodiments, some or all of the other waiting threads may be waiting for a different thread to complete an action (a thread other than the one on which the given thread is waiting), or may be waiting for the same thread on which the given thread is waiting to complete a different action than that on which the given thread is waiting.

In this example, if (after the given thread puts itself into an inactive state) the number of inactive threads meets a predetermined turbo quorum, shown as the positive exit from 140, an active thread may enter turbo mode, as in 150. In various embodiments, the active thread that enters turbo mode may be the thread on which the given thread is currently waiting, another thread on which one or more other inactive threads are currently waiting, or another active thread on which no threads are currently waiting. For example, in embodiments in which one or more inactive threads are waiting for a thread to release a lock, the active thread that enters turbo mode may be the thread that currently holds the lock. As illustrated in FIG. 1, as long as the action on which the given thread is waiting is not completed, shown as the negative exit from 160, the method may include waiting for that action to be completed (shown as the feedback to 160). For example, after the given thread puts itself in inactive state, it may remain in an inactive state until the action on which the given thread is waiting is completed. Once the action on which the given thread is waiting is completed, shown as the positive exit from 160, the method may include the given thread resuming active execution, as in 170. For example, in embodiments in which the given thread entered the inactive state by invoking MONITOR-WAIT instruction pair, a change in the value of the memory location specified by the instruction pair may cause the given thread to exit the inactive state. In other embodiments, the operating system or another executing thread or process may cause the given thread to exit the inactive state (e.g., by initiating an interrupt or another type of exception) in response to the waited-for action being completed.

As illustrated in this example, if no other threads are inactive at the time the given thread begins waiting (shown as the negative exit from 120), the given thread may not put itself into an inactive state, in some embodiments. In such embodiments, the given thread may simply wait (in an active state) for the particular action to be completed (as in 160 and the feedback to 160 from the negative exit of 160), and this waiting may not contribute to a decision to move an active thread into turbo mode. Alternatively, if the given thread puts itself into an inactive state, but the number of inactive threads does not meet the turbo quorum (shown as the negative exit from 140), this may not result in an active thread entering turbo mode. In this case, the method may include waiting for the particular action to be completed (as in 160 and the feedback to 160 from the negative exit of 160) before the given thread resuming execution, as in 170.

As noted above, in some embodiments, a given thread may put itself into an inactive state even if no other waiting threads are inactive at the time that the given thread begins waiting. For example, in some embodiments, if other threads are also waiting (even if they are not currently inactive), the given thread may put itself in an inactive state. This may, in turn, trigger other (active) waiters to put themselves into an inactive state, as in the flocking mechanism described above. Note that in the example illustrated in FIG. 1, after the negative exit from 140, if another thread puts itself into an inactive state, and this action results in the system meeting the turbo quorum, the given thread (or another active thread) may enter turbo mode. Also note that putting an active thread in turbo mode may allow enough progress may be made by that thread to improve overall performance whether or not any other threads were waiting on the active thread. For example, rapidly completing execution of any active thread may decrease the amount of time before a thread on which other threads waits is able to enter turbo mode.

In one example, in an embodiment in which turbo mode is explicitly enabled, if a thread T1 holds a lock L on a critical section, and the threads executing on the remaining cores in that same package contend for L, the waiting threads may invoke the MONITOR-MWAIT instruction pair to allow T1 achieve a pre-defined (e.g., processor-specific) turbo quorum. This may allow T1 to run in turbo mode, which in turn may allow T1 to exit the critical section more quickly. Using this mechanism, the system may be dynamically reconfigured. In other words, at various times this mechanism may elect different threads on different cores to run in turbo mode as they take turns hold the lock. This mechanism (which may be referred to as Dynamic Access Control, or a Dynamic ACS mechanism) may entail a modest amount of bookkeeping to track the "waits-for" graph (i.e. the information about which threads are waiting on which other threads) and to check for turbo quorum, as described herein.

Figure 2:
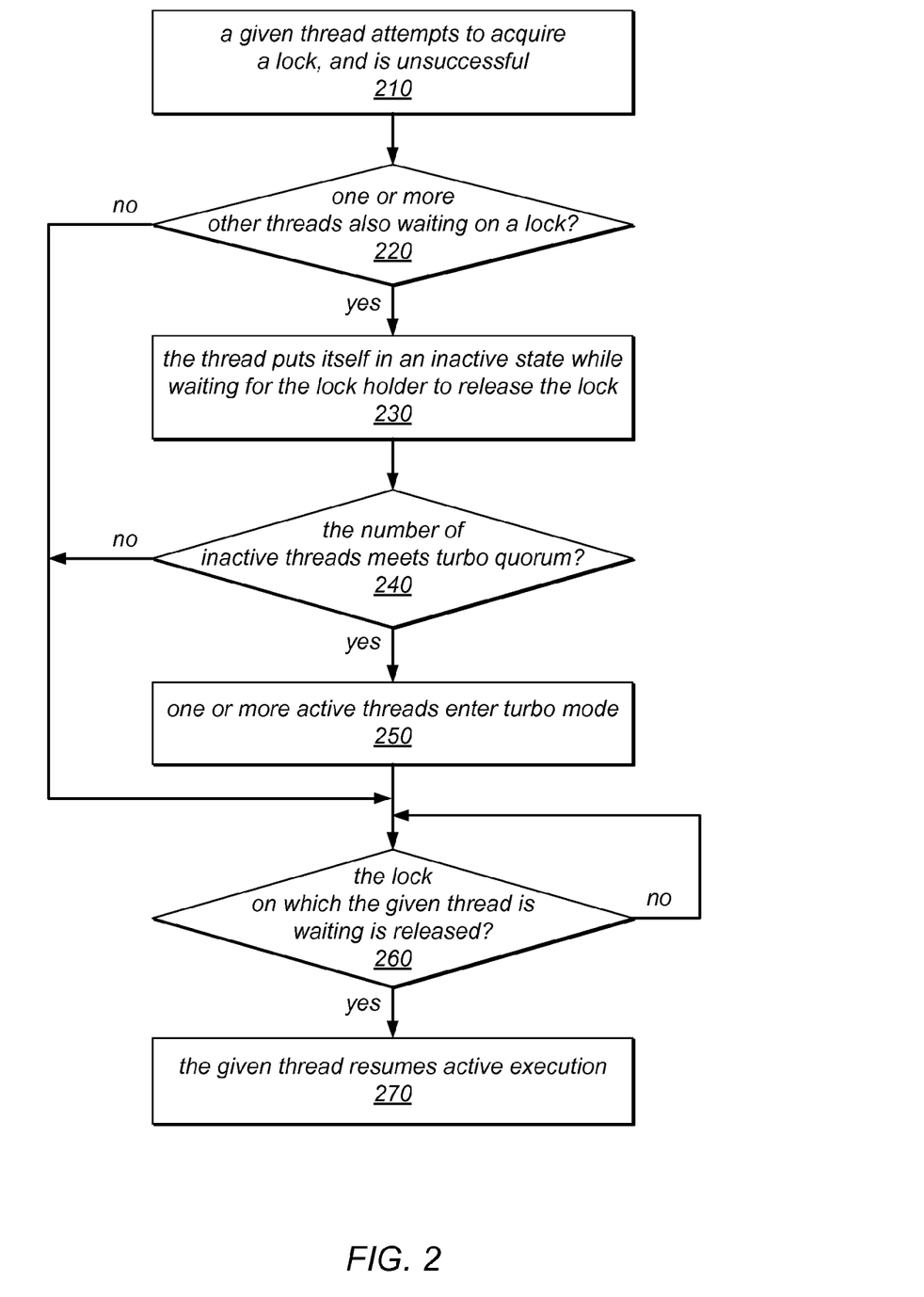
FIG. 2 is a flow diagram illustrating a method for enabling turbo mode in a system in which multiple threads contend for one or more locks, according to one embodiment.

One embodiment of a method for enabling turbo mode in a system in which multiple threads may contend for one or more locks is illustrated in FIG. 2. In this example, the method may include a given thread attempting to acquire a lock, but being unsuccessful in its attempt to acquire the lock, as in 210. For example, the given thread may attempt to acquire a lock, but the lock may be held by another thread. If one or more other threads are also waiting on a lock or locks (e.g., various ones of the other threads may be waiting on the same lock that the given thread attempted to acquire and/or on one or more other locks), the method may include the given thread putting itself into an inactive state while waiting for the lock. Specifically, the given thread may be waiting for an indication that the lock holder has released the lock and/or that ownership of the lock has been passed to the given thread (e.g., by detecting a change in the lock state or a change in an ownership record associated with the lock), in various embodiments. This is illustrated in FIG. 2 as the positive exit from 220 and element 230. As previously noted, the given thread may put itself into an inactive state by executing a HALT type instruction or a MONITOR-MWAIT type instruction pair, or by taking other steps, according to different embodiments.

In this example, if (after the given thread puts itself into an inactive state) the number of inactive threads meets a predetermined turbo quorum, shown as the positive exit from 240, an active thread may enter turbo mode, as in 250. In various embodiments, the active thread that enters turbo mode may be the thread that holds the lock on which the given thread is currently waiting, another thread that holds a lock on which one or more other inactive threads are currently waiting, or another active thread (e.g., an active thread that does not hold a lock on which any threads are currently waiting). As illustrated in FIG. 2, as long as the lock on which the given thread is waiting is held, shown as the negative exit from 260, the method may include waiting for that lock to be released (shown as the feedback to 260). For example, after the given thread puts itself in inactive state, it may remain in an inactive state until the action on which the given thread is waiting is completed. Once the lock on which the given thread is waiting is released, shown as the positive exit from 260, the method may include the given thread resuming active execution, as in 270. For example, in embodiments in which the given thread entered the inactive state by invoking MONITOR-WAIT instruction pair, a change in the value of the memory location specified by the instruction pair (e.g., a lock state word or ownership record) may cause the given thread to exit the inactive state. In other embodiments, the operating system or another executing thread or process may cause the given thread to exit the inactive state (e.g., by initiating an interrupt or another type of exception) in response to the waited-for lock being released.

As illustrated in this example, if no other threads are waiting on a lock at the time the given thread begins waiting on the lock (shown as the negative exit from 220), the given thread may not put itself into an inactive state, in some embodiments. In such embodiments, the given thread may simply wait (in an active state) for the lock to be released (as in 260 and the feedback to 260 from the negative exit of 260), and this waiting may not contribute to a decision to move an active thread into turbo mode. Alternatively, if the given thread puts itself into an inactive state, but the number of inactive threads does not meet the turbo quorum (shown as the negative exit from 240), this may not result in an active thread entering turbo mode. In this case, the method may include waiting for the lock on which the given thread is waiting to be released (as in 260 and the feedback to 260 from the negative exit of 260) before the given thread resuming execution, as in 270.

Note that, as in the previous example, a given thread may put itself into an inactive state even if no other waiting threads are inactive at the time that the given thread begins waiting, in some embodiments. For example, in some embodiments, if other threads are also waiting (even if they are not currently inactive), the given thread may put itself in an inactive state. This may, in turn, trigger other (active) waiters to put themselves into an inactive state, as in the flocking mechanism described above. Note that in the example illustrated in FIG. 2, after the negative exit from 240, if another thread puts itself into an inactive state, and this action results in the system meeting the turbo quorum, the given thread (or another active thread) may enter turbo mode. Again note that putting an active thread in turbo mode may allow enough progress may be made by that thread to improve overall performance whether or not any other threads were waiting on the active thread. For example, rapidly completing execution of any active thread may decrease the amount of time before a thread on which other threads waits is able to enter turbo mode.

Figure 3:
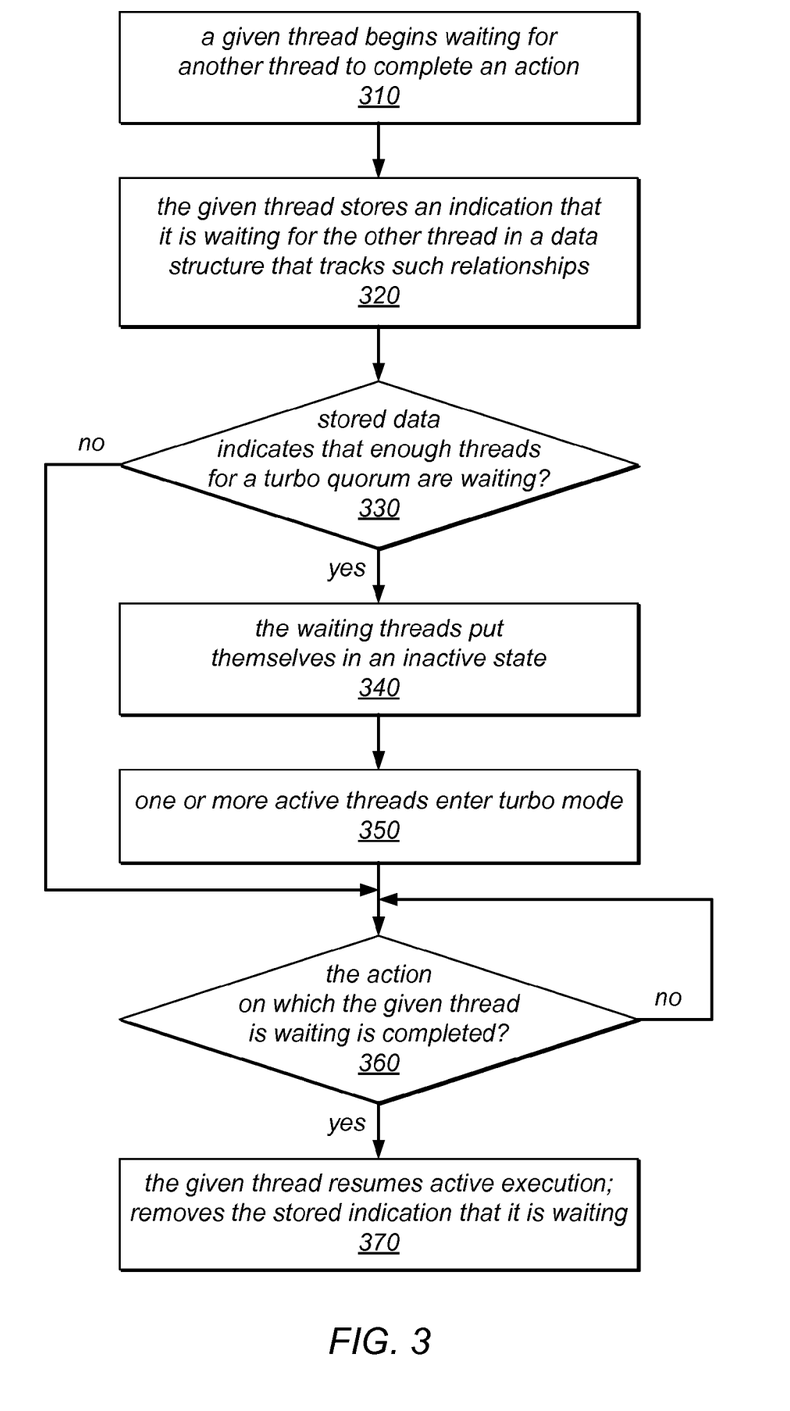
FIG. 3 is a flow diagram illustrating a method for enabling turbo mode that employs stored indications of waiting threads, according to one embodiment.

One embodiment of a method for enabling turbo mode that employs stored indications of waiting threads is illustrated by the flow diagram in FIG. 3. As illustrated at 310, in this example, the method may include a given thread beginning to wait for another thread to complete a particular action. In some embodiments (including some described herein), the given thread may be waiting for the other thread to release a lock, while in other embodiments, the given thread may be waiting for the other thread to perform or complete to some other arbitrary type of action. As illustrated at 320, in this example, the method may include the given thread storing an indication that it is waiting for the other thread in a data structure that is used to track such relationships. For example, in various embodiments, the given thread may store an indication that it is waiting (and/or an identifier of the thread on which it is waiting) in a table, a "waits-for" graph, or another type of data structure. In some embodiments, the data structure in which the indication that the given thread is waiting on another thread is stored may also store a value indicating whether the given thread is in an active or inactive state. In some embodiments, the data structure may be accessible by other threads in the system (e.g., threads executing on the same processor or processor core) so that they may determine whether (and how many) executing threads are currently waiting on other threads. In some embodiments, a single data structure may store indications of waiting and/or active status for all of the currently executing threads in the system (or on a processor or processor core in the system), or for all currently executing threads that are waiting for another thread and/or that are currently in an inactive state. In other embodiments, each executing or waiting thread may be associated with a different data structure that is used to track the waiting and/or active status of that thread.

As illustrated in this example, if the data stored in the tracking data structure indicates that the number of waiting threads would be enough to meet a turbo quorum if they were put in an inactive state (shown as the positive exit from 330), the waiting threads may put themselves in an inactive state (as in 340). As previously noted, in various embodiments, this determination may be made by each thread itself or by a centralized mechanism. For example, in embodiments that employ a centralized decision-making process, an operating system (or another coordinating thread or process) may coordinate between waiting threads in order indicate to them that they should place themselves an inactive state and/or may take actions that explicitly cause the waiting threads to be placed in an inactive state. In other embodiments, when one or more waiting threads notice that a large subset of the other executing threads are waiting (e.g. for a lock), the threads themselves may decide to work together to enable the lock holder run faster. For example, each waiting thread may continue to spin on its waited-for lock or condition and may occasionally (or periodically) access a table, waits-for graph, or other data structure to determine whether the number of waiting threads would be enough to meet a turbo quorum if they were put in an inactive state. Note that at any given time, some threads may be waiting in an active state (e.g., spinning and checking for an indication that they should put themselves in an inactive state), while other threads may be waiting in an inactive state.

In various embodiments, each of the waiting threads may put itself in an inactive state by executing a HALT type instruction or a MONITOR-MWAIT type instruction pair, or by taking other steps, according to different embodiments. In some embodiments, the action on which all of the waiting threads are waiting may be the same action (e.g., a particular action to be taken by a particular thread). For example, in some embodiments all of the waiting threads may be waiting for an active thread to release the same lock, to relinquish ownership of the same shared resource, or to write a particular value (either the same value or a thread-specific value) to the same shared location. In other embodiments, some or all of the other waiting threads may be waiting for different threads to complete a particular action, or may be waiting for the same thread to complete different actions.

In this example, after the waiting threads put themselves into an inactive state, which results in the number of inactive threads meeting a pre-determined turbo quorum, one or more active threads may enter turbo mode, as in 350. In various embodiments, the active thread(s) that enter turbo mode may be thread(s) on which one or more inactive threads are currently waiting, or another active thread on which no threads are currently waiting. For example, in embodiments in which one or more inactive threads are waiting for a thread that holds a lock to release the lock, the active thread that enters turbo mode may be the thread that currently holds the lock. As illustrated in FIG. 3, as long as the action on which the given thread is waiting is not completed, shown as the negative exit from 360, the method may include waiting for that action to be completed (shown as the feedback to 360). For example, if the given thread puts itself in an inactive state, it may remain in the inactive state until the action on which the given thread is waiting (e.g., the lock owner releasing the lock and/or relinquishing ownership of the lock or the shared resource that it protects to the given thread) is completed. Once the action on which the given thread is waiting is completed, shown as the positive exit from 360, the method may include the given thread resuming active execution, as in 370. For example, in embodiments in which the given thread entered the inactive state by invoking MONITOR-WAIT instruction pair, a change in the value of the memory location specified by the instruction pair (e.g., a lock state word or ownership record) may cause the given thread to exit the inactive state. In other embodiments, the operating system or another executing thread or process may cause the given thread to exit the inactive state (e.g., by initiating an interrupt or another type of exception) in response to the waited-for lock being released. As illustrated in this example, the method may also include the given thread removing (or updating) the stored indication that it was waiting on another thread.

As illustrated in this example, if the stored data indicates that not enough threads are waiting on other threads at the time the given thread begins waiting to create a turbo quorum (shown as the negative exit from 330), the waiting threads may not put themselves into an inactive state, in some embodiments. In other embodiments, some threads may put themselves in an inactive state, while others may continue to wait in an active state. In the example illustrated in FIG. 3, if there are not enough waiting threads to create a turbo quorum, the given thread may simply wait (in an active state) for the particular action to be completed (as in 360 and the feedback to 360 from the negative exit of 360), and this waiting may not contribute to a decision to move an active thread into turbo mode.

As in previous examples, in some embodiments, a given thread may put itself into an inactive state even if no other waiting threads are inactive at the time that the given thread begins waiting. For example, in some embodiments, if other threads are also waiting (even if they are not currently inactive), the given thread may put itself in an inactive state. This may, in turn, trigger other (active) waiters to put themselves into an inactive state, as in the flocking mechanism described above. Note that in the example illustrated in FIG. 3, after the negative exit from 330, if another thread puts itself into an inactive state, and this action results in the system meeting the turbo quorum, the given thread (or another active thread) may enter turbo mode. Again note that putting an active thread in turbo mode may allow enough progress may be made by that thread to improve overall performance whether or not any other threads were waiting on the active thread. For example, rapidly completing execution of any active thread may decrease the amount of the time before a thread on which other threads waits is able to enter turbo mode.

Note that in various embodiments, the techniques described above for turbo enablement may be implemented in conjunction with mechanisms for performing flat combining, or in conjunction with a special type of lock (as described in more detail below). In systems that employ flat combining and/or these special types of locks, the execution of critical sections may be delegated from contending threads to the current lock holder. In such embodiments, if there is latency associated with entering turbo mode, the turbo enablement techniques may be used to further improve performance. For example, in such embodiments, one thread (the current lock holder) may tend to stay in turbo mode for long periods (longer than in systems that do not allow such delegation) as it processes requests made on behalf of other contending threads.

In embodiments that employ these special locks, a given thread may determine the state of a lock that it wishes to acquire (e.g., a lock whose ownership would be required in order to execute a particular critical section or access a particular shared resource). If the lock is free, the given thread may use an atomic operation to acquire the lock. If the lock is not free (i.e. if it is owned by another thread), the given thread may use one or more atomic operations to add its work to a list of work items that require ownership of the lock. For example, if a thread that does not hold a lock wants to increment a variable that is protected by that lock, or write new values to three memory locations protected by that lock, it may add these work items to a list of work items that require ownership of that lock, and then may put itself in a low power (or inactive) state. When the lock holder finishes its own work, it may perform some or all of these work items on the list on behalf of the given thread (and/or other work items logged on the list by other threads).

The techniques described herein for enabling turbo mode may work well with these special types of locks, in some embodiments. For example, if a current lock holder is enabled to run in turbo mode (e.g., by putting enough waiting threads into an inactive state to meet a turbo quorum), the lock holder may run faster when doing its own work. In addition, the lock holder may also perform some or all of the work delegated to it using the mechanisms provided by this type of lock (again at the faster turbo speed). In other words, the lock holder may stay in turbo mode longer than if it were performing only its own work, and may complete the work of multiple threads at the faster turbo speed. In embodiments in which one or more of the waiting threads entered the inactive state by invoking MONITOR-WAIT instruction pair, a change in the value in the memory location specified by the instruction pair (which may be a lock state word or ownership record, for example, a change in which may indicate that the lock holder has released the lock) may cause the waiting thread(s) to exit the inactive state, i.e. to resume execution in an active state. In other embodiments, the operating system or another executing thread or process may cause the waiting thread(s) to exit the inactive state (e.g., by initiating an interrupt or another type of exception) in response to the waited-for lock being released.

Figure 4:
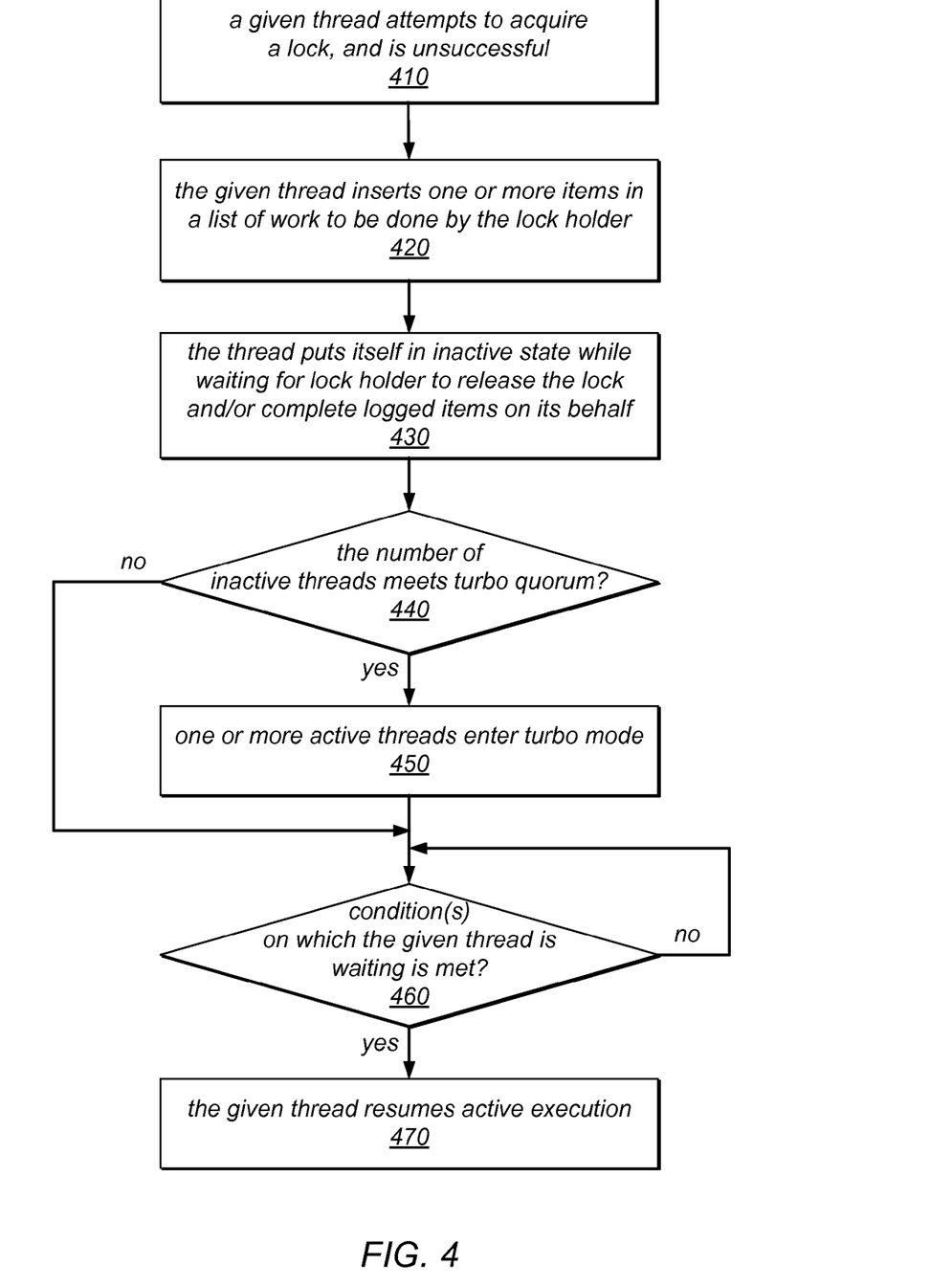
FIG. 4 is a flow diagram illustrating a method for an active thread in turbo mode to perform work delegated to it on behalf of an inactive thread, according to one embodiment.

One embodiment of a method for an active thread in turbo mode to perform work delegated to it on behalf of an inactive thread is illustrated by the flow diagram in FIG. 4. In this example, multiple threads contend for a lock that is needed in order to do some work (e.g., access a shared resource that is protected by the lock, or enter a critical section that is protected by the lock). As illustrated in this example, the method may include a given thread attempting to acquire a lock (e.g., using an atomic transaction), but being unsuccessful in its attempt to acquire the lock, as in 410. For example, the given thread may attempt to acquire a lock and fail, or the given thread may not even attempt to acquire the lock if it determines that the lock is being held by another thread. In some embodiments, in response to a failed or abandoned attempt to acquire the lock, the method may include the given thread inserting one or more items in a list of work to be done by the lock holder, as in 420. For example, the given thread may use atomic instructions to add one or more work items to a list of work items that can only be performed by a current holder of that lock. Note that in some embodiments, there may by multiple such lists of work items, each associated with a respective lock.

As illustrated in this example, once the given thread has logged one or more work items (i.e. once the given thread has delegated that work to another thread), the method may include the given thread putting itself into an inactive state while waiting for the lock holder to release the lock or to complete the logged work items on its behalf. For example, the given thread may remain in an inactive state while waiting for an indication that the lock holder has released the lock and/or that ownership of the lock has been passed to the given thread (e.g., by detecting a change in the lock state or a change in an ownership record associated with the lock), or an indication that any work items it logged have been completed (e.g., by detecting a change in the list of work items, the removal of the work items that it added to the list, a change in the status of the work items that it added to the list, or a change in the value of a target of one or more work items that it added to the list, such as a change in the value of a shared location that is made on behalf of the given thread by the lock holder), in various embodiments. As previously noted, the given thread may put itself into an inactive state by executing a HALT type instruction or a MONITOR-MWAIT type instruction pair, or by taking other steps, according to different embodiments.

In this example, if (after the given thread puts itself into an inactive state) the number of inactive threads meets a predetermined turbo quorum, shown as the positive exit from 440, one or more active threads may enter turbo mode, as in 450. In various embodiments, the active thread that enters turbo mode may be the thread that holds the lock on which the given thread is currently waiting, another thread that holds a lock on which one or more other inactive threads are currently waiting, or another active thread (e.g., an active thread that does not hold a lock on which any threads are currently waiting). As illustrated in FIG. 4, as long as the condition(s) on which the given thread is waiting (e.g., as long as the lock on which the given thread is waiting is held, and/or the work that the given thread logged has not been completed), shown as the negative exit from 460, the method may include waiting for the condition(s) to be met (shown as the feedback to 460). For example, if the given thread puts itself in inactive state, it may remain in an inactive state until the condition(s) on which the given thread is waiting are met. Once the condition (s) on which the given thread is waiting are met, shown as the positive exit from 460, the method may include the given thread resuming active execution, as in 470. For example, in embodiments in which the given thread entered the inactive state by invoking MONITOR-WAIT instruction pair, a change in the value of the memory location specified by the instruction pair (e.g., a lock state word or ownership record) may cause the given thread to exit the inactive state. In other embodiments, the operating system or another executing thread or process may cause the given thread to exit the inactive state (e.g., by initiating an interrupt or another type of exception) in response to the waited-for lock being released. Note that in various embodiments, the lock on which the given thread is waiting may be released by an active thread that is executing in turbo mode or by another active thread. Note also that the worked logged by the given thread may be performed on behalf of the given thread by an active thread that is executing in turbo mode or by another active thread, in various embodiments.

As illustrated in this example, if (after the given thread puts itself into an inactive state) the number of inactive threads does not meet the turbo quorum (shown as the negative exit from 440), this may not result in an active thread entering turbo mode. In this case, the method may include waiting for the condition(s) on which the given thread is waiting (as in 460 and the feedback to 460 from the negative exit of 460) before the given thread resuming execution, as in 470.

Note that a given thread may log work items to be done by a lock holder and put itself into an inactive state even if no other waiting threads are inactive at the time that the given thread begins waiting. For example, in some embodiments, if other threads are also waiting (even if they are not currently inactive), the given thread may log one or more work items to a delegation list and put itself in an inactive state. This may, in turn, trigger other (active) waiters to log one or more work items to the delegation list and/or put themselves into an inactive state, as in the flocking mechanism described above. Note that in the example illustrated in FIG. 4, after the negative exit from 440, if another thread puts itself into an inactive state, and this action results in the system meeting the turbo quorum, the given thread (or another active thread) may enter turbo mode, and may perform its own work and/or any logged work items while executing in turbo mode. Again note that putting an active thread in turbo mode may allow enough progress may be made by that thread to improve overall performance whether or not any other threads were waiting on the active thread (or on the lock that the active thread holds). For example, rapidly completing execution of any active thread may decrease the amount of the time before a thread on which other threads waits is able to enter turbo mode. Note that in some embodiments, it may be the case that not all of the work items logged by waiting threads are performed by an active thread (e.g., a lock holder or a thread executing in turbo mode) prior to the waiting threads resuming active execution. In such embodiments, the waiting threads may still need to perform some or all of the work items they logged once the current lock holder releases the lock. In some embodiments, one of the waiting threads may subsequently acquire the lock and may perform any remaining ones of its own work items and may also perform some or all work items logged on the same work list by other waiting threads.

Figure 5:
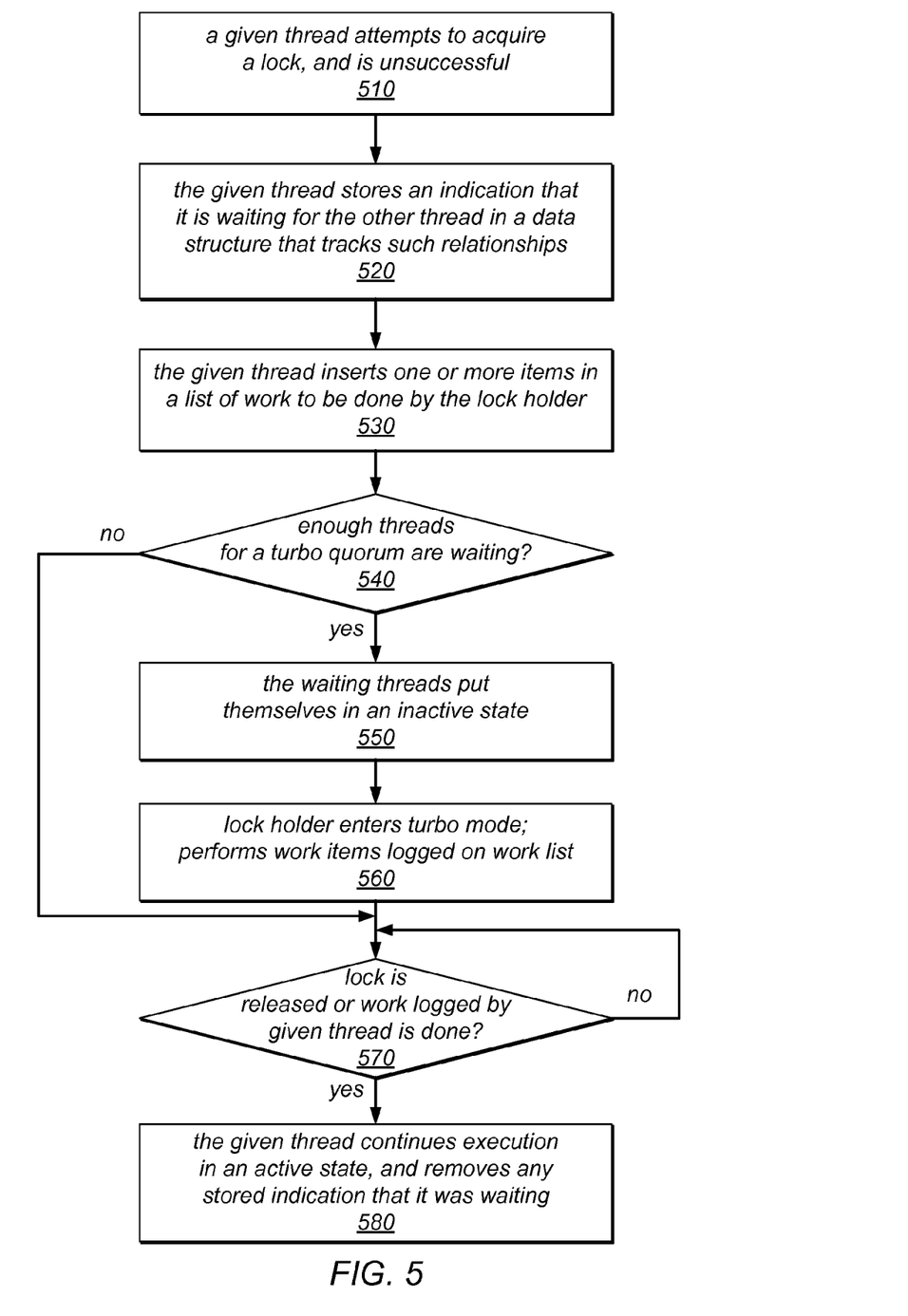
FIG. 5 is a flow diagram illustrating a method for enabling an active thread to enter turbo mode and to perform work delegated to it on behalf of two or more inactive threads, according to one embodiment.

One embodiment of a method for enabling an active thread to enter turbo mode and to perform work delegated to it on behalf of two or more inactive threads is illustrated by the flow diagram in FIG. 5. In this example, multiple threads contend for a lock that is needed in order to do some work (e.g., access a shared resource that is protected by the lock, or enter a critical section that is protected by the lock). As illustrated in this example, the method may include a given thread attempting to acquire a lock, but being unsuccessful in its attempt to acquire the lock, as in 510. For example, the given thread may attempt to acquire a lock and fail, or the given thread may not even attempt to acquire the lock if it determines that the lock is being held by another thread. In some embodiments, in response to a failed or abandoned attempt to acquire the lock, the method may include the given thread storing an indication that it is waiting for the other thread in a data structure that is used to track such relationships, as in 520. For example, in various embodiments, the given thread may store an indication that it is waiting (and/or an identifier of the thread on which it is waiting) in a table, a "waits-for" graph, or another type of data structure. In some embodiments, the data structure in which the indication that the given thread is waiting on another thread is stored may also store a value indicating whether the given thread is in an active or inactive state. In some embodiments, the data structure may be accessible by other threads in the system (e.g., threads executing on the same processor or processor core) so that they may determine whether (and how many) executing threads are currently waiting on other threads. In some embodiments, a single data structure may store indications of waiting and/or active status for all of the currently executing threads in the system (or on a processor or processor core in the system), or for all currently executing threads that are waiting for another thread and/or that are currently in an inactive state. In other embodiments, each executing or waiting thread may be associated with a different data structure that is used to track the waiting and/or active status of that thread.

As illustrated in this example, the method may also include the given thread inserting one or more items in a list of work to be done by the lock holder, as in 530. For example, given thread may use one or more atomic instructions to add work items to such a list, and this list may also include work items logged by other currently inactive threads. If, (after the given thread has logged one or more work items), the data stored in the tracking data structure indicates that the number of waiting threads would be enough to meet a turbo quorum if they were put in an inactive state (shown as the positive exit from 540), the waiting threads may put themselves in an inactive state (as in 550) while waiting for the lock holder to release the lock or to complete any logged work items on their behalf. For example, the given thread and any other threads waiting on the same lock may remain in an inactive state while waiting for an indication that the lock holder has released the lock and/or that ownership of the lock has been passed to the thread (e.g., by detecting a change in the lock state or a change in an ownership record associated with the lock), or an indication that any work items it logged have been completed (e.g., by detecting a change in the list of work items, the removal of the work items that it added to the list, a change in the status of the work items that it added to the list, or a change in the value of a target of one or more work items that it added to the list, such as a change in the value of a shared location that is made on behalf of the given thread or another waiting thread by the lock holder), in various embodiments.

As previously noted, in various embodiments, this determination may be made by each thread itself or by a centralized mechanism. For example, in embodiments that employ a centralized decision-making process, an operating system (or another coordinating thread or process) may coordinate between waiting threads in order indicate to them that they should place themselves an inactive state and/or may take actions that explicitly cause the waiting threads to be placed in an inactive state. In other embodiments, when one or more waiting threads notice that a large subset of the other executing threads are waiting (e.g. for a lock), the threads themselves may decide to work together to enable the lock holder run faster. For example, each waiting thread may continue to spin on its waited-for lock or condition and may occasionally (or periodically) access a table, waits-for graph, or other data structure to determine whether the number of waiting threads would be enough to meet a turbo quorum if they were put in an inactive state. Note that at any given time, some threads may be waiting in an active state (e.g., spinning and checking for an indication that they should put themselves in an inactive state), while other threads may be waiting in an inactive state.

In various embodiments, each of the waiting threads may execute a HALT type instruction or a MONITOR-MWAIT type instruction pair, or may take other steps to place itself in an inactive state, according to different embodiments. In some embodiments, the lock on which all of the waiting threads are waiting may be the same lock on which the given thread is waiting. In other embodiments, some or all of the waiting threads other than the given thread may be waiting for different locks and/or for various threads to complete particular actions, or may be waiting for the lock holder to complete various actions. For example, some of the waiting threads may be waiting for a particular value to be written to a lock state word, an ownership record, or a specified shared location, in various embodiments.

As illustrated in this example, if the stored data indicates that not enough threads are waiting on other threads at the time the given thread begins waiting to create a turbo quorum (shown as the negative exit from 540), the threads may not put themselves into an inactive state, in some embodiments. In other embodiments, some threads (which may or may not include the given thread) may put themselves in an inactive state, while others (which may or may not include the given thread) may continue to wait in an active state. In the example illustrated in FIG. 5, if there are not enough waiting threads to create a turbo quorum, the given thread may simply wait (in an active state) for the lock on which the given thread is waiting to be released and/or the work that the given thread logged to been completed (as in 570 and the feedback to 570 from the negative exit of 570). Once one or both of these condition(s) are met, shown as the positive exit from 570, the method may include the given thread resuming execution, as in 580.

In this example, if the waiting threads put themselves into an inactive state (at 550), which results in the number of inactive threads meeting a pre-determined turbo quorum, the lock holder may enter turbo mode, as in 560. In some embodiments, the lock holder may perform its own work items, and may also perform some or all of the work items logged in the list of work by the given thread and/or by any other waiting or inactive threads.

As illustrated in FIG. 5, as long as the lock on which the given thread is waiting has not been released and/or the work that the given thread logged has not been completed (shown as the negative exit from 570), the method may include the given thread waiting for one or both of these conditions to be met (shown as the feedback to 570). Once the condition(s) are met, shown as the positive exit from 570, the method may include the given thread resuming execution in an active state, as in 580. For example, if the given thread previously put itself in an inactive state, it may exit the inactive state in response to the waited-for condition(s) being met. As previously noted, in embodiments in which the given thread entered the inactive state by invoking MONITOR-WAIT instruction pair, a change in the value of the memory location specified by the instruction pair (e.g., a lock state word or ownership record) may cause the given thread to exit the inactive state. In other embodiments, the operating system or another executing thread or process may cause the given thread to exit the inactive state (e.g., by initiating an interrupt or another type of exception) in response to the waited-for lock being released. Note that in various embodiments, the lock on which the given thread is waiting may be released by an active thread that is executing in turbo mode or by another active thread. Note also that the worked logged by the given thread may be performed on behalf of the given thread by an active thread that is executing in turbo mode or by another active thread, in various embodiments. If the given thread did not put itself in an inactive state, but waited in an active state, it may continue execution in the active state. As illustrated at 580, if the given thread stored an indication that it was waiting for another thread, that indication may be removed in response to the waited-for condition(s) being met.

Note that, as in the previous example, a given thread may log work items to be done by a lock holder and put itself into an inactive state even if no other waiting threads are inactive at the time that the given thread begins waiting. For example, in some embodiments, if other threads are also waiting (even if they are not currently inactive), the given thread may log one or more work items to a delegation list and put itself in an inactive state. This may, in turn, trigger other (active) waiters to log one or more work items to the delegation list and/or put themselves into an inactive state, as in the flocking mechanism described above. This may, in turn, trigger other (active) waiters to put themselves into an inactive state, as in the flocking mechanism described above. Note that in the example illustrated in FIG. 5, after the negative exit from 540, if another thread puts itself into an inactive state, and this action results in the system meeting the turbo quorum, the given thread (or another active thread) may enter turbo mode, and may perform its own work and/or any logged work items while executing in turbo mode. Again note that putting an active thread in turbo mode may allow enough progress may be made by that thread to improve overall performance whether or not any other threads were waiting on the active thread (or on the lock that the active thread holds). For example, rapidly completing execution of any active thread may decrease the amount of the time before a thread on which other threads waits is able to enter turbo mode. Note that in some embodiments, it may be the case that not all of the work items logged by waiting threads are performed by an active thread (e.g., a lock holder or a thread executing in turbo mode) prior to the waiting threads resuming active execution. In such embodiments, the waiting threads may still need to perform some or all of the work items they logged once the current lock holder releases the lock. In some embodiments, one of the waiting threads may subsequently acquire the lock and may perform any remaining ones of its own work items and may also perform some or all work items logged on the same work list by other waiting threads.

Note that the techniques described herein may be applicable in systems that do not include a fixed partition of fast and slow processors, and may allow threads running on various processor cores to dynamically reconfigure the system for asymmetric performance through the collaborative use of these techniques. In other words, using these techniques, threads may work cooperatively toward providing collective or aggregate throughput for an application as a whole. For example, if a thread T1 is waiting for some thread T2 to complete some action A, the use of MONITOR-MWAIT type instructions or similar constructs by thread T1 may in some embodiments accelerate T2's completion of A, which may in turn decrease the time T1 spends waiting. In addition to improving overall performance of a group of collaboration threads, the techniques described herein may in some embodiments also conserve power relative to traditional contention management and waiting policies.

Note that while many of the examples described herein are directed to computer systems and/or processors in which a single thread runs on each processor core, the techniques described herein may be applied in systems and/or processors in which multiple threads are executed on each processor core, or on at least some of the processor cores implemented in a multi-core package or processor chip. In some embodiments in which multiple threads are executed on each processor core, all of the threads executing on a given processor core may need to be put in an inactive state in order for the processor core to be included in a turbo quorum. For example, in an embodiment in which there are eight processor cores, each of which executes two threads, the turbo quorum may be expressed in terms of the number of processor cores whose threads are inactive (e.g., seven of the eight cores may need to have two inactive threads, i.e. no active threads, in order to meet the turbo quorum). In other embodiments, the turbo quorum may be expressed in terms of the total number of threads that must be inactive to meet the turbo quorum. In some embodiments in which multiple threads execute on a single processor core, if the turbo quorum is met, only one of the active threads on one of the processor cores may enter turbo mode. In other embodiments, two or more threads on the same processor core (or on different processor cores) may enter turbo mode.

Figure 6:
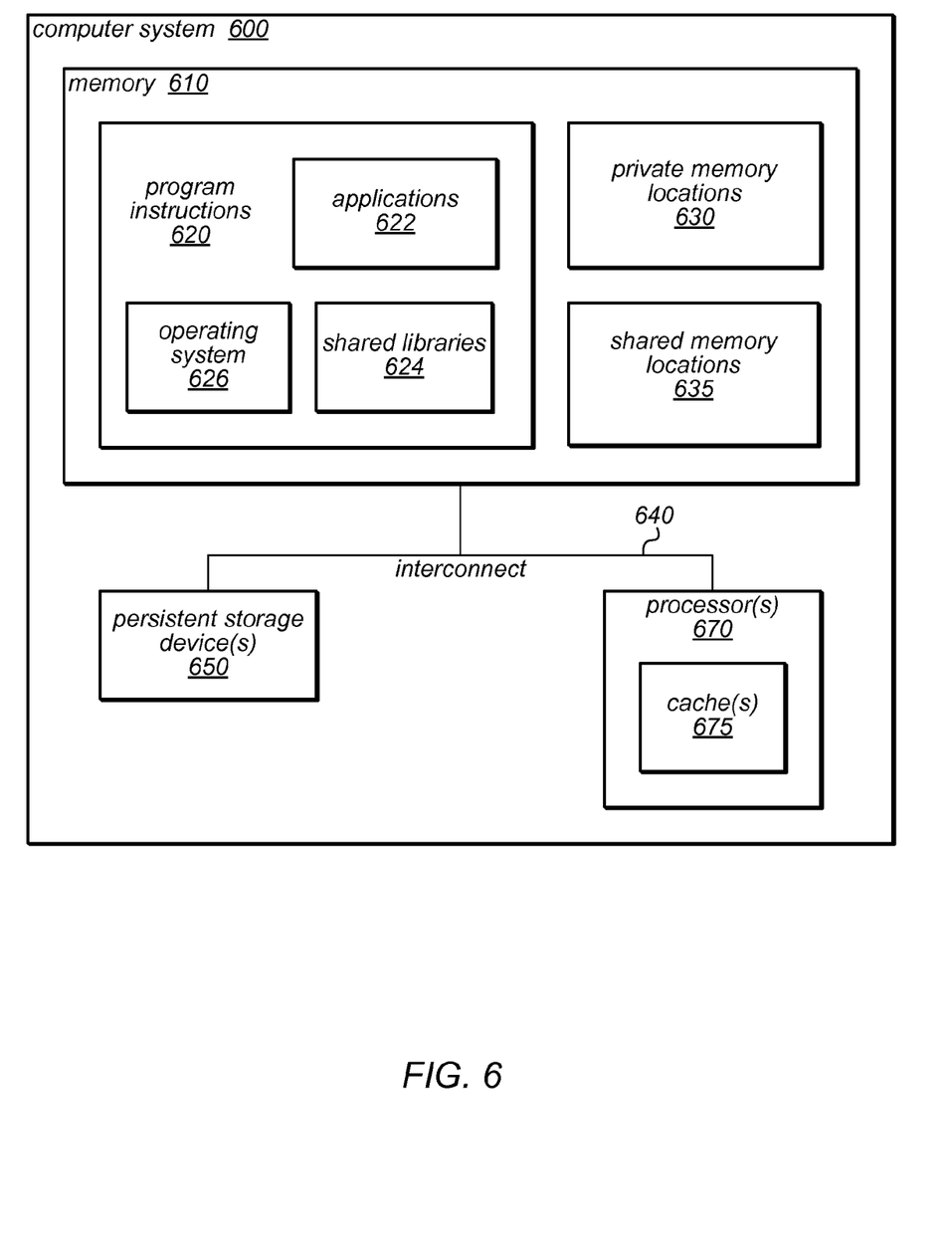
FIG. 6 is a block diagram of a computer system configured to enable one or more processor cores, or threads executing thereon, to enter turbo mode, according to various embodiments.

The techniques described herein for enabling one or more cores (or threads executing thereon) to enter turbo mode, may be implemented in any of a wide variety of computing systems. FIG. 6 illustrates a computing system configured to implement the methods described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for enabling one or more cores (or threads executing thereon) to enter turbo mode, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In other embodiments, program instructions executable to perform the methods described herein may be communicated using optical, acoustical or other form of propagated signal (e.g., carrier waves, infrared signals, digital signals, etc.).

In various embodiments, computer system 600 may include one or more processors 670, each of which may include multiple cores (any of which may be single or multi-threaded), and each of which may provide a turbo mode facility. For example, multiple processor cores may be included in a single processor chip (e.g., a single processor 670), and multiple processor chips may be included on a CPU board, two or more of which may be included in computer system 600. Each of the processors 670 may include one or more caches 675, which may include a hierarchy of caches, in various embodiments. The computer system 600 may also include one or more persistent storage devices 650 (e.g. optical storage, magnetic storage, hard drive, tape drive, solid state memory, etc) and one or more system memories 610 (e.g., one or more of cache, SRAM, DRAM, RDRAM, EDO RAM, DDR RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 670, the storage device(s) 650, and the system memory 610 may be coupled to the system interconnect 640 and may communicate with each other through system interconnect 640. In general, interconnect 640 may be implemented as any broadcast, point-to-point, or hybrid communication mechanism such as a front side bus, Ethernet, InfiniBand™, etc.

One or more of the system memories 610 may contain program instructions 620. Program instructions 620 may be executable to implement one or more applications 622 (which may include one or more accesses to a critical section or shared resource protected by a lock, as described herein), shared libraries 624, and/or operating systems 626. In some embodiment, program instructions 620 may be encoded in platform native binary, any interpreted language such as Java™ byte-code, or in any other language such as C/C++, Java™, etc., or in any combination thereof. Note that in some embodiments, application 622, shared libraries 624, and operating system 626 may be implemented in the same programming language, while in other embodiments, they may be implemented in different programming languages (in various combinations). The program instructions 620 may include functions, operations and/or other processes for enabling one or more cores (or threads executing thereon) to enter turbo mode, as described herein. Such support and functions may exist in one or more of the shared libraries 624, operating systems 626, or applications 622, in various embodiments. The system memory 610 may further comprise private memory locations 630 and/or shared memory locations 635 where data may be stored. For example, private memory locations 630 may store data that is accessible only to specific threads (e.g., thread-local data), while shared memory locations 635 may store data accessible to multiple concurrently executing threads, processes, or transactions, in various embodiments. The data stored in private memory locations 630 and/or shared memory locations 635 may include any or all of (but is not limited to) data indicating lock states, lock ownership records, tables, waits-for graphs, or other data structures used to track waiting and/or inactive threads and/or to indicate the threads on which they are waiting, or any other bookkeeping or lock-related data usable in performing the techniques described herein, in various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
   performing, by a computer:
   executing a plurality of concurrent threads on a plurality of processor cores; and
   while executing the plurality of threads:
   a given one of the plurality of threads beginning to wait for another thread to complete a particular action;
   in response to determining that one or more other ones of the plurality of threads are waiting for another thread to complete an action, the given thread entering in an inactive state; and
   in response to determining that a quorum of the plurality of threads are in the inactive state, one of the plurality of threads that is in an active state entering a turbo mode, wherein executing in the turbo mode comprises executing at a higher speed than a baseline speed at which the plurality of threads execute when all of the threads are assumed to be active.

2. The method of claim 1,
   wherein the method further comprises storing data indicating which of the plurality of threads is waiting for another thread to complete an action; and
   wherein said determining that one or more other ones of the plurality of threads are waiting for another thread to complete an action comprises accessing the stored data.

3. The method of claim 1, further comprising:
   in response to determining that enough of the plurality of threads are waiting to meet the quorum, the one or more other ones of the plurality of threads that are waiting for another thread to complete an action entering the inactive state.

4. The method of claim 1, wherein said beginning to wait comprises the given thread waiting for the other thread to release a lock that is held by the other thread.

5. The method of claim 4, wherein the one or more other threads that are waiting for another thread to complete an action are also waiting for the lock to be released.

6. The method of claim 4,
   wherein the method further comprises, prior to said beginning to wait, the given thread attempting to acquire the lock; and
   wherein said beginning to wait is performed in response to the attempt to acquire the lock being unsuccessful.

7. The method of claim 4,
   wherein the one of the plurality of threads executing in the turbo mode is the thread that holds the lock; and
   wherein the method further comprises:
   prior to the given thread entering the inactive state, the given thread logging one or more work items on a list of work items to be performed by a holder of the lock; and
   the one of the plurality of threads executing in the turbo mode performing at least a portion of the work items on the list.

8. The method of claim 1, wherein said entering an inactive state comprises the given thread executing one or more instructions that cause the core on which the given thread is executing to enter a low power state.

9. The method of claim 1, further comprising:
   in response to the particular action being completed, the given thread resuming execution in the active state.

10. The method of claim 1,
    wherein each of the plurality of processor cores executes two or more threads; and
    wherein said determining that a quorum of the plurality of threads are in the inactive state comprises determining that the two or more threads on each of two or more of the plurality of processor cores are in the inactive state.

11. A system comprising:
    a plurality of processor cores; and
    memory coupled to the plurality of processor cores and storing program instructions that when executed by the plurality of processor cores cause the plurality of processor cores to perform:
    executing a plurality of concurrent threads; and
    while executing the plurality of threads:
    a given one of the plurality of threads beginning to wait for another thread to complete a particular action;
    in response to determining that one or more other ones of the plurality of threads are waiting for another thread to complete an action, the given thread entering in an inactive state; and in response to determining that a quorum of the plurality of threads are in the inactive state, one of the plurality of threads that is in an active state entering a turbo mode, wherein executing in the turbo mode comprises executing at a higher speed than a baseline speed at which the plurality of threads execute when all of the threads are assumed to be active.

12. The system of claim 11, wherein when executed by the plurality of processor cores, the program instructions further cause the plurality of processor cores to perform:
storing data indicating which of the plurality of threads is waiting for another thread to complete an action; and
wherein said determining that one or more other ones of the plurality of threads are waiting for another thread to complete an action comprises accessing the stored data.

13. The system of claim 11, wherein when executed by the plurality of processor cores, the program instructions further cause the plurality of processor cores to perform:
in response to determining that enough of the plurality of threads are waiting to meet the quorum, the one or more other ones of the plurality of threads that are waiting for another thread to complete an action entering the inactive state.

14. The system of claim 11,
wherein said beginning to wait comprises the given thread waiting for the other thread to release a lock that is held by the other thread;
wherein when executed by the plurality of processor cores, the program instructions further cause the plurality of processor cores to perform, prior to said beginning to wait, the given thread attempting to acquire the lock; and
wherein said beginning to wait is performed in response to the attempt to acquire the lock being unsuccessful.

15. The system of claim 14,
wherein the one of the plurality of threads executing in the turbo mode is the thread that holds the lock; and
wherein when executed by the plurality of processor cores, the program instructions further cause the plurality of processor cores to perform:
prior to the given thread entering the inactive state, the given thread logging one or more work items on a list of work items to be performed by a holder of the lock; and
the one of the plurality of threads executing in the turbo mode performing at least a portion of the work items on the list.

16. The system of claim 11, further comprising:
in response to the particular action being completed, the given thread resuming execution in the active state.

17. A non-transitory, computer readable storage medium storing program instructions that when executed by a computer that comprises a plurality of processor cores cause the computer to perform:
executing a plurality of concurrent threads on the plurality of processor cores; and
while executing the plurality of threads:
a given one of the plurality of threads beginning to wait for another thread to complete a particular action;
in response to determining that one or more other ones of the plurality of threads are waiting for another thread to complete an action, the given thread entering in an inactive state; and
in response to determining that a quorum of the plurality of threads are in the inactive state, one of the plurality of threads that is in an active state entering a turbo mode, wherein executing in the turbo mode comprises executing at a higher speed than a baseline speed at which the plurality of threads execute when all of the threads are assumed to be active.

18. The storage medium of claim 17, wherein when executed by the computer, the program instructions further cause the computer to perform:
storing data indicating which of the plurality of threads is waiting for another thread to complete an action; and
wherein said determining that one or more other ones of the plurality of threads are waiting for another thread to complete an action comprises accessing the stored data.

19. The storage medium of claim 17, wherein when executed by the computer, the program instructions further cause the computer to perform:
in response to determining that enough of the plurality of threads are waiting to meet the quorum, the one or more other ones of the plurality of threads that are waiting for another thread to complete an action entering the inactive state.

20. The storage medium of claim 17,
wherein said beginning to wait comprises the given thread waiting for the other thread to release a lock that is held by the other thread;
wherein the one of the plurality of threads executing in the turbo mode is the thread that holds the lock; and
wherein when executed by the computer, the program instructions further cause the computer to perform:
prior to the given thread entering the inactive state, the given thread logging one or more work items on a list of work items to be performed by a holder of the lock; and
the one of the plurality of threads executing in the turbo mode performing at least a portion of the work items on the list.

* * * * *

UNITED STATES PATENT AND TRADEMARK OFFICE
CERTIFICATE OF CORRECTION

| | | |
|---|---|---|
| PATENT NO. | : 8,775,837 B2 | Page 1 of 1 |
| APPLICATION NO. | : 13/213833 | |
| DATED | : July 8, 2014 | |
| INVENTOR(S) | : Dice et al. | |

It is certified that error appears in the above-identified patent and that said Letters Patent is hereby corrected as shown below:

On title page, column 1, under Inventors, line 1, delete "Foxboro, MA" and insert
-- Foxborough, MA --, therefor.

In the Specification

In column 13, line 1, delete "may by" and insert -- may be --, therefor.

Signed and Sealed this
Tenth Day of March, 2015

Michelle K. Lee
*Deputy Director of the United States Patent and Trademark Office*